United States Patent [19]

Künst

[11] Patent Number: 4,502,062

[45] Date of Patent: Feb. 26, 1985

[54] APPARATUS FOR RECORDING DATA ON A RECORDING CARRIER

[75] Inventor: Hermann Künst, Berlin, Fed. Rep. of Germany

[73] Assignees: Technomed Elektromed.Apparatebau GmbH; Ingenieurburo Dipl.-Ing. Hermann Kunst, both of Fed. Rep. of Germany

[21] Appl. No.: 417,393

[22] Filed: Sep. 13, 1982

[30] Foreign Application Priority Data

Oct. 28, 1981 [DE] Fed. Rep. of Germany ....... 3143135

[51] Int. Cl.³ ............................................ G01D 15/08

[52] U.S. Cl. .................................... 346/155; 346/163

[58] Field of Search ............... 346/1.1, 16 PH, 139 R, 346/155, 163, 139 C

[56] References Cited

U.S. PATENT DOCUMENTS

| | | | |
|---|---|---|---|
| 3,718,936 | 2/1973 | Rice, Jr. | 346/155 |
| 3,761,954 | 9/1973 | Hanseu et al. | 346/163 X |
| 3,946,400 | 3/1976 | Buro | 346/155 X |
| 4,180,824 | 12/1979 | Yvard et al. | 346/155 X |
| 4,189,736 | 2/1980 | De Filipps | 346/155 X |
| 4,399,447 | 8/1983 | Lakhani et al. | 346/155 |

*Primary Examiner*—Thomas H. Tarcza

*Attorney, Agent, or Firm*—Basile, Weintraub & Hanlon

[57] ABSTRACT

An apparatus for recording data on a recording carrier includes a recording comb and a selection circuit. The recording comb is formed by a plurality of juxtaposed, insulated electrodes which can be individually controlled by the selection circuit. A grid-like contact field is provided on the electrodes and has a plurality of staggered contact surfaces. Each contact surface extends over a plurality of electrodes whereof only one electrode is bared.

25 Claims, 6 Drawing Figures

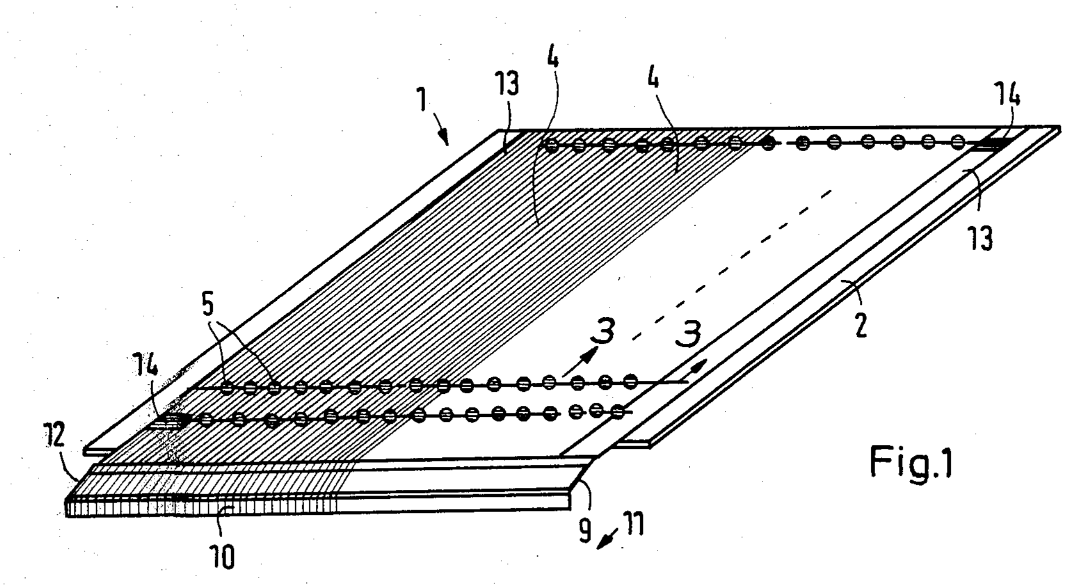
Fig.1
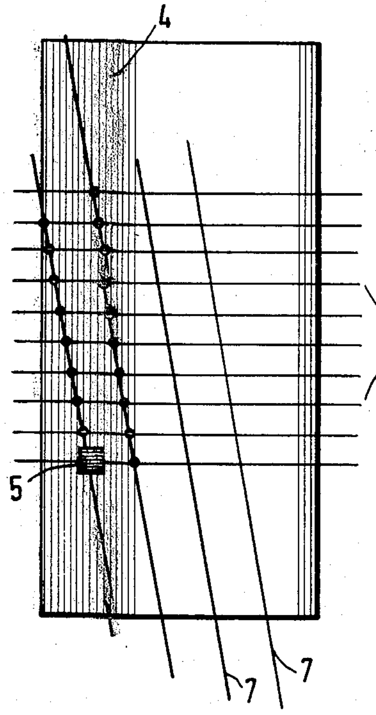
Fig.2
Fig.3
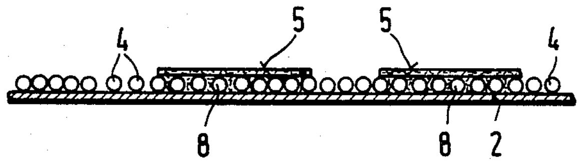

Fig.4
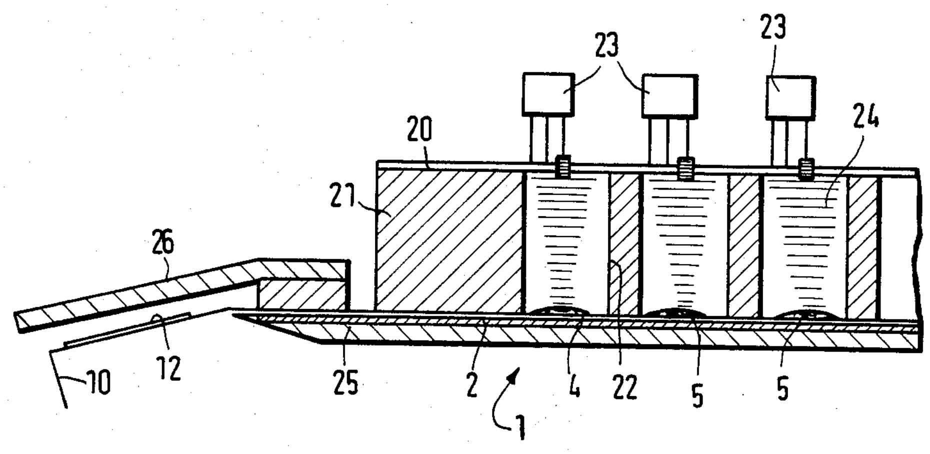
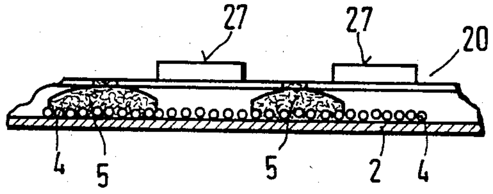
Fig.5
Fig.6
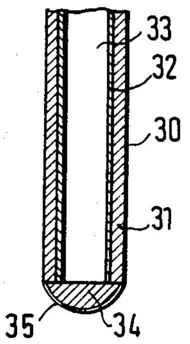

APPARATUS FOR RECORDING DATA ON A RECORDING CARRIER

BACKGROUND OF THE INVENTION

1. Field of the Invention

The present invention relates to apparatus for recording data on a recording carrier or support.

2. Description of the Prior Art

DOS No. 2,137,371 discloses a process for producing a recording head with wire recording electrodes in which closely juxtaposed wire turns are placed on a rotating drum and held in position by means of an adhesive support previously applied to the drum. The resulting wire cylinder with an adhesive support is cut open, removed from the drum and spread out to form a flat foil. One end of the juxtaposed wire electrodes are pressed between two facing plates to form the recording head. The other end of the recording electrodes of the foil are subdivided into a plurality of groups for connection to a selection circuit. The electrodes of each group are connected in each case to a circuit card. The circuit cards with the wire portions are twisted and bent so that they can be inserted into a selection circuit. However, with this type of contacting, the twisting and bending of the groups of electrodes can lead to damage to the electrodes. Furthermore, a large amount of space is required for receiving the circuit cards.

DOS No. 2,126,043 discloses a process for producing a recording head in which the electrode wire is placed with a clearly defined spacing on an insulating material plate, the plate having staggered, outwardly directed leads contacted with the electrode wire at points displaced relative to one another by spot welding using resistance, laser beam or electron beam welding methods. Following the contacting of the leads with the electrode wire, the arrangement is cast in a sythetic resin, with the ends of the electrode wire projecting from the cast insulating material body and the leads projecting out of the cast body perpendicular to the axis of the recording electrodes being in the form of plug pins. The recording head produced by this process has the disadvantage that a clearly defined spacing between the electrodes is required, so as to ensure that contact only takes place between one electrode wire and one lead in each case. In addition, the spacing of the electrodes is dependent on the width of the plug pins. Thus, with this known arrangement, it is not possible to have a randomly narrow spacing of the recording electrodes.

SUMMARY OF THE INVENTION

The problem to which the present invention is directed is to provide an apparatus for recording data on a recording carrier in compact form in which, for increasing the resolution, the spacing of the electrodes of the recording comb can substantially be reduced to the thickness of their insulation, independently of the contacting and in which a random number of electrodes can be juxtaposed, without any significant increase in the space requirements due to contacting.

The apparatus of the present invention includes a plurality of juxtaposed, insulated electrodes which form a recording comb. A selection circuit is provided for separately controlling each electrode. A grid-like contact panel is disposed over the electrodes and includes a plurality of contact surfaces. Each contact surface can extend over several electrodes but only contacts a single electrode.

As a result of the grid-like contact panel, there is no change in the functional dimensions, i.e. the width of the recording comb during contacting. In principle, contacting is possible between randomly closely juxtaposed recording electrodes and a random number of juxtaposed recording electrodes. The dimensions of the contact surfaces forming the grid-like contact panel are not dependent on the thickness of an electrode or the reciprocal spacing of the electrodes because they can extend over several electrodes. Thus, the production process for the contact surfaces is based on generous tolerances.

A compact construction results from arranging the selection circuit in a plane above the recording comb with the contact surfaces of the recording comb being connected to the selection circuit by means of detachable contacts, e.g. contact springs or clips. This compact construction can be further improved if the selection circuit, preferably constructed in integrated or hybrid technology, is connected to the recording comb by means of fixed contacts so that a very small connected recording comb—selection circuit unit is formed.

As a result of the elastic or resilient arrangement of the electrodes in the direction of the recording carrier, it is possible to adapt to unevennesses of the latter and to the burning of the electrodes. Constant recording precision is achieved by fixing the electrodes at right angles to the recording support with the aid of the highly flexible strip.

By supplying the current via electrodes located on the actual recording head, which are mechanically the same as the recording electrodes, the current can be applied zonally to the recording carrier so that the current supply electrodes do not mark the recording carrier. The current supply electrodes are subject to wear similar to the recording electrodes and, thus, the two types of electrodes can be changed simultaneously. Through the construction of the electrodes as coaxial conductors, in which the inner conductor forms the recording electrode and the power supply takes place by means of the outer conductor, it is possible to obtain an accurate limitation of the recording point. Thus there is complete shielding from the stray radiation resulting from the recording sparks.

The life of the electrodes is increased by providing them with constant current so that the electrode current is limited to a fixed value. In addition, the complete selection circuit is protected against incorrect operation. By constructing the electrodes as coaxial conductors, the recording comb can also be used for a thermal recording head. It is advantageous that all the recording points are movable.

BRIEF DESCRIPTION OF THE DRAWINGS

The invention is described in greater detail hereinafter relative to non-limitative embodiments and the attached drawings in which:

FIG. 1 is a perspective view of a recording comb;

FIG. 2 depicts the arrangement of the contact surfaces on the recording comb;

FIG. 3 is a cross sectional view through the recording comb along line 3—3 in FIG. 1;

FIG. 4 is a cross sectional view through the recording head and the selection circuit depicting the connection between the contact surfaces and the selection circuit by means of contact springs and clips;

FIG. 5 is a cross sectional view through a part of the recording comb and the selection circuit with the contact surfaces and selection circuit being fixedly interconnected; and FIG. 6 is a cross sectional view through a coaxial electrode used in connection with a thermal recording head.

DESCRIPTION OF THE PREFERRED EMBODIMENTS

FIG. 1 shows a recording comb 1 of the type used in an apparatus for recording data. A plurality of juxtaposed insulated wires 4 are fixed by means of an adhesive to a foil 2, e.g. in the form of a pertinax foil. Such a wire—foil arrangement can be produced with the aid of a winding device. A take-up drum carrying the foil 2 provided with the adhesive is used for this purpose. The insulated wire is continuously wound from a rotating reel onto the foil 2 by means of a wire guidance device moving parallel to the axis of the take-up drum during its rotation. In this way, a wire cylinder is formed, which is then cut open and further processed to a recording comb 1 as shown in FIG. 1. The juxtaposed wires form electrodes 4 on which is provided a grid-like contact panel or bank, which is formed by a plurality of contact surfaces 5.

FIG. 2 shows the arrangement of the grid-like contact panel. At right angles to the electrodes 4 there are lines 6 and parallel columns 7 which are positioned obliquely to the elongated electrodes 4. The contact surfaces 5 are formed at intersections of the lines and columns. Thus, the contact panel has a plurality of contact surface lines at right angles to the recording electrodes 4; the contact surfaces 5 of one contact surface line being displaced somewhat with respect to the contact surfaces of the preceding line.

FIG. 3 shows the contact between the contact surfaces 5 and the electrodes 4. Each contact surface 5 extends over several electrodes 4, whereof only one electrode, such as electrode 8, is bared or stripped. There must be no damage to the insulation of the line running very close to it during such stripping. The wire for the electrodes 4 in the aforementioned winding process is stripped at the points at which the electrodes 4 are to be conductively connected to the contact surfaces 5. The stripping process is, preferably, controlled by a computer. The contact surfaces 5 consist, for example, of conductive silver or a conductive adhesive. They are applied, for example, by screen process printing, currentless or galvanic deposition of metals or vacuum deposition.

At one end 9, the electrodes 4 project beyond the foil 2 (FIG. 1). In recording area 10, the electrodes 4 are sharply bent, so that during the recording process they rest approximately perpendicularly on the recording carrier, not shown. The direction of movement of the recording carrier is indicated by arrow 1. In the vicinity of the recording area 10, the electrodes 4 are fixed by a highly flexible, but limitedly extensible strip 12, such as a thermoplastic coating, which is mounted at right angles to the recording carrier. As a result, there can be no lateral displacement of the electrodes thereby giving a constant precision of the recording. In the recording area 10, the electrodes 4 are individually movable in the direction of the recording carrier and are resilient. As a result, they can adapt to unevennesses of the recording carrier and possible burn-out. In the recording area 10, the electrodes 4 are provided with a wear-resisting coating.

For recording with the recording comb 1 in accordance with FIG. 1, the recording carrier or support is constituted by a recording paper with a metallic surface. Current is supplied to the metallic surface of the paper by means of current supply electrodes. Burning occurs on the metallic surface as a result of the current flow. The current must be zonally supplied to the electrically conductive surface so that the current flow leads to burning as a result of the punctiform contact between the recording electrode and the metallic surface. In the case of a recording comb 1, the power supply takes place by means of power or current supply electrodes 13, arranged to the left and right of recording electrodes 4. The current supply electrodes 13 are mechanically identical to the recording electrodes 4 and, like the recording electrodes 4, rest on the metallic surface of the recording paper. The current density of the current supply electrodes 13 must be much lower than that of the recording electrodes so that they do not mark the recording paper. Thus, a larger number of current supply electrodes 13 must be provided and are in each case connected by means of a contact point to the left and right of the recording electrodes 4.

FIG. 4 shows the recording comb 1 in sectional form in conjunction with a selection circuit 20. Selection circuit 20, constructed as a printed circuit, is located vertically above the recording comb. An insulating plate 21 having perforations 22 is positioned between the selection circuit 20 and the recording comb 1. Selection or control takes place by means of a transistor matrix indicated by the diagrammatically represented transistors 23. A transistor 23 is associated with each recording electrode 4. The electrical connection between the transistors 23 and the recording electrodes 4 takes place by means of contact springs or clips 24 placed under tension in the perforations 22 of the insulating plate 21 between the contact surfaces 5 and the terminals of transistors 23.

The bottom of the recording comb 1 is provided with a metallic plate 25 for shielding against the stray radiation caused by the recording sparks. In the same way, a metallic plate 26 arranged above the recording area is used for shielding, limitation and protection of the deflection of the electrodes.

In the embodiment depicted in FIG. 5, the recording comb 1 is fixedly connected to the selection circuit 20 by means of the contact points 5. Circuit 20 is located in a vertical plane above the recording comb, the electronic components being designated by reference number 27. Whenever the recording comb 1 is changed, it is also necessary to change the selection circuit 20. This connection type is particularly suitable for selection circuits 20 constructed of integrated or hybrid technology because then a very small, connected recording comb—selection circuit unit is obtained. Such an arrangement could, for example, be cast as one unit.

In the embodiment according to FIG. 1, the current is supplied and/or removed by means of the current supply electrodes 13 positioned laterally with respect to the recording electrodes 4. It is also possible to arrange in an alternately juxtaposed manner the recording electrodes 4 and the current supply electrodes 13. The electrical connection of all of the current supply electrodes can be brought about by contact strips, positioned at right angles to the electrodes 4 and 13 and in the vicinity of which only electrodes 13 are bared.

Another possibility for the current supply is provided by an arrangement in which the current supply electrodes 13 are positioned in front of the recording electrodes 4 in the recording direction. For this purpose, the electrodes 13 can be arranged on the foil 2 below the recording electrodes 4.

Another current supply possibility consists of using the selection circuit 20 for connecting as current supply electrodes those electrodes not momentarily acting as recording electrodes. This arrangement can be varied in such a way that, as a function of the frequency of the control of the recording electrodes, only certain of the latter are connected as current supply electrodes.

In the hitherto described embodiments, the electrodes comprise a conductive electrode core surrounded by an insulation. However, it is also conceivable for the electrodes to be constructed as coaxial electrodes. In this case, the current supply can take place by means of the electrically conductive outer shell of all of the electrodes of a recording comb. In this arrangement, the stray radiation resulting from the recording sparks is subject to perfect shielding. The contacting of the inner cores of the coaxial electrodes serving as recording electrodes and the contact surfaces 5 is brought about in accordance with the embodiment of FIG. 1. However, the outer shell must be removed prior to contacting.

FIG. 6 illustrates a sectional view through coaxial electrode 30 intended for use in a thermal recording head. A coaxial electrode 30 has a conductive outer shell 31, an insulating coating 32 and a conductive core 33. A resistance element 34 is located at the end of electrode 30 and is provided with an abrasion-proof protective coating 35. During the passage of current, the resistance element 34 is heated and forms a recording point on the recording carrier, preferrably constructed as a heat-sensitive paper. The arrangement of the electrodes and their contacting is in accordance with a recording comb illustrated in FIG. 1.

The recording electrodes 4 are controlled by means of a constant current, i.e. the electrode current is limited to a fixed value. As a result of this measure, high starting current is avoided.

The contacting procedure in accordance with the grid-like contact field is only considered in the described embodiments in connection with a recording comb 1 of an apparatus for recording data. However, it is obvious that this type of contacting could be used on any type of parallel data lines in which a plug unit or detachable plug connection is provided on a surface and not in a line.

What is claimed is:

1. An apparatus for recording data on a recording carrier comprising:

a plurality of juxtaposed, insulated recording electrodes forming a fixed recording comb;

selection circuit means for separately controlling each individual electrode;

a grid-like contact panel disposed over the recording electrodes, the contact panel having a plurality of contact surfaces; and wherein each contact surface extending over more than one recording electrode and contacting a single recording electrode.

2. The apparatus of claim 1 wherein the contact panel is formed with lines of contact surfaces disposed substantially perpendicular to the direction of recording, the contact surfaces being offset from the adjacent contact surface along each line.

3. The apparatus of claim 1 wherein the selection circuit means is disposed in a vertical plane over the plane of the recording comb.

4. The apparatus of claim 1 further including:

detachable contact means for connecting the contact surfaces to the selection circuit means.

5. The apparatus of claim 4 wherein the contact means comprises contact springs.

6. The apparatus of claim 1 wherein the contact surfaces are fixedly connected to the selection circuit means.

7. The apparatus of claim 1 wherein the selection circuit means includes a transistor matrix, a transistor being associated with each contact surface.

8. The apparatus of claim 1 further including a movable recording carrier engaging the recording electrodes.

9. The apparatus of claim 8 wherein in the area of contact between the recording electrodes and the recording carrier, the recording electrodes are bent in the direction of the recording carrier.

10. The apparatus of claim 8 wherein the recording electrodes are resilient and are individually movable in the direction of the recording carrier.

11. The apparatus of claim 8 wherein the recording electrodes are mounted in a flexible and extensible strip in the area of contact with the recording carrier and are disposed substantially perpendicular to the recording carrier.

12. The apparatus of claim 8 wherein the recording electrodes are provided with a wear-resistant coating in the area of contact with the recording carrier.

13. The apparatus of claim 8 further including:

current supply electrodes mounted on the recording comb and resting on the recording carrier.

14. An apparatus for recording data on a recording carrier comprising:

a plurality of juxtaposed, insulated recording electrodes forming a fixed recording comb;

selection circuit means for separately controlling each individual electrode;

a grid-like contact panel disposed over the recording electrodes, the contact panel have a plurality of contact surfaces;.

each contact extending over at least one recording electrode and contacting a single recording electrode;

a movable recording carrier engaging the recording electrodes;

current supply electrodes mounted on the recording comb and resting on the recording carrier; and wherein the current supply electrodes are constructed identical to the recording electrodes and are disposed in the same plane as the recording electrodes.

15. An apparatus for recording data on a recording carrier comprising:

a plurality of juxtaposed, insulated recording electrodes forming a fixed recording comb;

selection circuit means for separately controlling each individual electrode;

a grid-like contact panel disposed over the recording electrodes, the contact panel having a plurality of contact surfaces;

each contact extending over at least one recording electrode and contacting a single recording electrode;

a movable recording carrier engaging the recording electrodes;

current supply electrodes mounted on the recording comb and resting on the recording carrier; and a plurality of current supply electrodes disposed on opposite sides of the recording electrodes and commonly connected by contact points on opposed sides of the recording electrodes.

16. An apparatus for recording data on a recording carrier comprising:

a plurality of juxtaposed, insulated recording electrodes forming a fixed recording comb;

selection circuit means for separately controlling each individual electrode;

a grid-like contact panel disposed over the recording electrodes, the contact panel having a plurality of contact surfaces;

each contact extending over at least one recording electrode and contacting a single recording electrode;

a movable recording carrier engaging the recording electrodes;

current supply electrodes mounted on the recording comb and resting on the recording carrier; and wherein the current supply electrodes are positioned between the recording electrodes.

17. An apparatus for recording data on a recording carrier comprising;

a plurality of juxtaposed, insulated recording electrodes forming a fixed recording comb;

selection circuit means for separately controlling each individual electrode;

a grid-like contact panel disposed over the recording electrodes, the contact panel having a plurality of contact surfaces;

each contact extending over at least one recording electrode and contacting a single recording electrode;

a movable recording carrier engaging the recording electrodes;

current supply electrodes mounted on the recording comb and resting on the recording carrier; and wherein the current supply electrodes and the recording electrodes are alternately juxtaposed.

18. The apparatus of claim 13 wherein the current supply electrodes and the recording electrodes are disposed in two spaced planes.

19. An apparatus for recording data on a recording carrier comprising:

a plurality of juxtaposed, insulated recording electrodes forming a fixed recording comb;

selection circuit means for separately controlling each individual electrode;

a grid-like contact panel disposed over the recording electrodes, the contact panel having a plurality of contact surfaces;

each contact extending over at least one recording electrode and contacting a single recording electrode;

a movable recording carrier engaging the recording electrodes;

current supply electrodes; and the recording electrodes and the current supply electrodes being constructed as coaxial electrodes.

20. An apparatus for recording data on a recording carrier comprising:

a plurality of juxtaposed, insulated recording electrodes forming a fixed recording comb;

selection circuit means for separately controlling each individual electrode;

a grid-like contact panel disposed over the recording electrodes, the contact panel having a plurality of contact surfaces;

each contact extending over at least one recording electrode and contacting a single recording electrode; and the selection circuit means connects as current supply electrodes those recording electrodes which, at the time of recording, are not acting as recording electrodes.

21. The apparatus of claim 20 wherein the recording electrodes are provided with constant current.

22. The apparatus of claim 1 further including:

shield means for shielding the recording comb from stray radiation resulting from recording sparks.

23. The apparatus of claim 8 further including:

secondary electrodes constructed as coaxial electrodes, each having an end facing the recording carrier and a resistance element which is heated to control the recording electrodes.

24. The apparatus of claim 23 wherein the resistance element is provided with a diathermic, abrasion-resistant protective coating.

25. A process for producing an electrode recording comb comprising the steps of:

providing a receiving surface for receiving a plurality of recording electrodes formed from insulated wire;

disposing an adhesive on the receiving surface for securing the wires in place on the receiving surface;

placing the wires in a closely juxtaposed manner on the receiving surface to form a wire-adhesive element;

converting the wire-adhesive element into a wire-adhesive foil by baring the wires prior to placement on the receiving surface at preselected points at which a recording electrode is to contact a contact surface; and applying contact surfaces to the preselected points.

* * * * *